United States Patent
Shen et al.

(10) Patent No.: US 11,893,829 B2
(45) Date of Patent: Feb. 6, 2024

(54) METHOD FOR DEPLOYING A FACE SAMPLE LIBRARY AND METHOD AND APPARATUS FOR BUSINESS PROCESSING BASED ON FACE RECOGNITION

(71) Applicant: CHINA UNIONPAY CO., LTD., Shanghai (CN)

(72) Inventors: Xi Shen, Shanghai (CN); Jialiang Kang, Shanghai (CN); Jien Zhou, Shanghai (CN)

(73) Assignee: CHINA UNION PAY CO., LTD., Shanghai (CN)

( * ) Notice: Subject to any disclaimer, the term of this patent is extended or adjusted under 35 U.S.C. 154(b) by 489 days.

(21) Appl. No.: 17/268,682

(22) PCT Filed: Jan. 22, 2020

(86) PCT No.: PCT/CN2020/073822
§ 371 (c)(1),
(2) Date: Feb. 16, 2021

(87) PCT Pub. No.: WO2020/220779
PCT Pub. Date: Nov. 5, 2020

(65) Prior Publication Data
US 2021/0192191 A1    Jun. 24, 2021

(30) Foreign Application Priority Data

Apr. 30, 2019    (CN) .......................... 201910362691.2

(51) Int. Cl.
G06V 40/16    (2022.01)
G06F 16/58    (2019.01)
(Continued)

(52) U.S. Cl.
CPC ........ *G06V 40/172* (2022.01); *G06F 16/5866* (2019.01); *G06Q 10/105* (2013.01); *G06V 40/50* (2022.01)

(58) Field of Classification Search
CPC .... G06V 40/172; G06V 40/50; G06V 40/161; G06V 40/16; G06V 40/166;
(Continued)

(56) References Cited

U.S. PATENT DOCUMENTS 8,055,532 B2    11/2011 Min et al.
9,607,019 B1    3/2017 Swift
(Continued)

FOREIGN PATENT DOCUMENTS

CN    101763507 A    6/2010
CN    102999526 A    3/2013
(Continued)

OTHER PUBLICATIONS

Office Action dated Jun. 2, 2022 issued for Chinese Patent Application No. 201910362691.2.
(Continued)

*Primary Examiner* — Nimesh Patel
(74) *Attorney, Agent, or Firm* — K&L Gates LLP

(57) ABSTRACT

The present application relates to the field of data processing, and provides a method for deploying a face sample library, and a method and an apparatus for business processing based on face recognition. The method for deploying a face sample library, comprises: obtaining historical business information of users corresponding to face samples in a password face sample library under a condition that a number of face samples in the password face sample library is greater than or equal to a preset sample number threshold, wherein confidential business passwords of the users corresponding to the face samples in the same password face
(Continued)

sample library are the same; dividing the password face sample library to obtain M levels of face sample sub-libraries according to the historical business information, where M is a positive integer. Use of the technical solution of the present application improves the accuracy of business processing using face recognition.

17 Claims, 5 Drawing Sheets

(51) Int. Cl.
 *G06Q 10/105* (2023.01)
 *G06V 40/50* (2022.01)
(58) Field of Classification Search
 CPC ...... G06V 40/168; G06V 40/70; G06V 20/46; G06V 40/1365; G06V 10/40; G06V 20/52; G06V 40/15; G06V 40/197; G06V 40/40; G06F 16/5866; G06F 16/2456; G06F 21/32; G06F 21/31; G06F 18/22; G06F 21/46; G06F 21/6245; G06F 2221/2103; G06F 18/00; G06F 2218/12; G06F 2221/2141; G06F 21/88; G06F 2221/2147; G06F 16/22; G06F 1/3231; G06F 16/00; G06F 16/83; G06F 16/903; G06F 2221/2133; G06Q 10/105; G06Q 20/40145; G06Q 10/10; G06Q 10/06398; G06Q 20/382; G06Q 20/4014; G06Q 50/265; G06Q 20/388; G06Q 20/4016; G06Q 20/3821; G06Q 20/3674; G06Q 20/3823; G06Q 20/4012; H04L 63/0861; H04L 63/083; H04L 9/3231; H04L 63/08; H04L 67/306; H04L 63/0876; H04L 2463/082; H04L 63/12; H04L 63/0838; H04L 63/10; H04L 9/3273; H04L 63/105; G07C 9/00563; G07C 9/37; G07C 9/38; G07C 9/25; G07C 9/32; G07C 9/33; G07C 9/23; H04W 12/06; H04W 12/068; H04W 12/069; H04W 12/08; H04W 12/062; H04W 12/065
 See application file for complete search history.

(56) References Cited

U.S. PATENT DOCUMENTS

| | | | |
|---|---|---|---|
| 10,136,320 | B1 | 11/2018 | Sugawara et al. |
| 2004/0193619 | A1 | 9/2004 | Venkatachary et al. |
| 2005/0254502 | A1* | 11/2005 | Choi ............... H04L 12/56 370/395.32 |
| 2014/0040187 | A1* | 2/2014 | Hatori ............... G06F 16/51 707/609 |
| 2014/0072185 | A1 | 3/2014 | Dunlap et al. |
| 2014/0250516 | A1* | 9/2014 | Gao ............... G06V 40/171 726/7 |
| 2014/0357362 | A1* | 12/2014 | Cohen ............... A63F 13/655 463/31 |
| 2016/0366220 | A1 | 12/2016 | Gottlieb et al. |
| 2017/0004369 | A1* | 1/2017 | Kim ............... G06F 18/28 |
| 2020/0089980 | A1* | 3/2020 | Burge ............... G06V 40/50 |
| 2020/0257894 | A1* | 8/2020 | Ogawa ............... G06V 40/166 |
| 2020/0293761 | A1* | 9/2020 | Li ............... G06V 40/172 |
| 2021/0012777 | A1* | 1/2021 | Liang ............... H04M 3/569 |

FOREIGN PATENT DOCUMENTS

| | | | | |
|---|---|---|---|---|
| CN | 106412045 | A | | 2/2017 |
| CN | 106909642 | A | | 6/2017 |
| CN | 107093066 | A | | 8/2017 |
| CN | 107844490 | A | | 3/2018 |
| CN | 108009521 | A | | 5/2018 |
| CN | 108256091 | A | | 7/2018 |
| CN | 108446692 | A | | 8/2018 |
| CN | 109271871 | A | | 1/2019 |
| CN | 109271917 | A | | 1/2019 |
| CN | 109471717 | | * 1/2019 | ............... G06K 9/00 |
| CN | 109299973 | A | | 2/2019 |
| CN | 109471717 | A | | 3/2019 |
| CN | 110210307 | A | | 9/2019 |
| JP | 2008146449 | A | | 6/2008 |
| JP | 2009104401 | A | | 5/2009 |
| JP | 2010170439 | A | | 8/2010 |
| WO | 2019071664 | A1 | | 4/2019 |

OTHER PUBLICATIONS

International Search Report dated Apr. 24, 2020 issued for PCT application No. PCT/CN2020/073822.
First Office Action dated Oct. 28, 2020 in connection with Chinese patent application No. 201910362691.2.
Liu et al., "Method of quick searching in a huge scale face database" Journal of Jilin University (Engineering and Technology Edition), vol. 40 No. 1, Jan. 2010.
Second Office Action dated Apr. 13, 2021 issued for Chinese Patent Application No. 201910362691.2.
Rejection Decision dated Aug. 11, 2021 issued for Chinese Patent Application No. 201910362691.2.
Office Action dated Mar. 16, 2022 issued for Japanese Patent Application No. 2021-531174.
Fujita et al., "Secure Permutation-based Indexing for Biometric Identification", The Institute of Electronics, Information and Communication Engineers, BioX2017-33 (Oct. 2017).
Oliver Langner, et al., "Presentation and validation of the Radboud Faces Database", Cognition and Emotion, Psychology Press: Taylor & Francis Group, 2010, 24 (8), 13 pages, downloaded on: Sep. 24, 2013.
CNIPA; Notice of the Granting of a Patent Right for an Invention for Chinese Patent Application No. 201910362691.2 dated Oct. 31, 2023, 6 pages.

* cited by examiner

METHOD FOR DEPLOYING A FACE SAMPLE LIBRARY AND METHOD AND APPARATUS FOR BUSINESS PROCESSING BASED ON FACE RECOGNITION

CROSS REFERENCE TO RELATED MATTER

This application is a National Stage of International Application No. PCT/CN2020/073822, filed on Jan. 22, 2020, which claims priority from Chinese Patent Application 201910362691.2 entitled "METHOD FOR DEPLOYING A FACE SAMPLE LIBRARY AND METHOD AND APPARATUS FOR BUSINESS PROCESSING BASED ON FACE RECOGNITION" filed on Apr. 30, 2019. Both of the applications are incorporated herein by reference in their entireties.

FIELD

The present application relates to a field of data processing, in particular to a method for deploying a face sample library, and a method and an apparatus for business processing based on face recognition.

BACKGROUND

In recent years, face recognition technology has become more and more widely used in various fields. For example, in the fields of transportation, commerce, public safety, etc. In order to make life and work of users more convenient, more and more business processing introduces face recognition technology. For example, payment business, login business, and other businesses with certain confidentiality. In these businesses, the 1:N mode of face recognition is often used.

The 1:N mode of face recognition refers to the existence of a face sample library during the face recognition process. There are N samples in the face sample library. A face image to be recognized is compared with N samples in the face sample library, and it is recognized whether the face image belongs to one of the N samples in the face sample library.

However, when the number of samples in the face sample library is too large, the accuracy of face recognition will decrease significantly, leading to an increase in the error rate of business processing using the 1:N mode of face recognition.

SUMMARY

Embodiments of the present application provides a method for deploying a face sample library, and a method and an apparatus for business processing based on face recognition, which can improve the accuracy of business processing using face recognition.

In the first aspect, the embodiment of the present application provides a method for deploying a face sample library, comprising: obtaining historical business information of users corresponding to face samples in a password face sample library under a condition that a number of face samples in the password face sample library is greater than or equal to a preset sample number threshold, wherein confidential business passwords of the users corresponding to the face samples in the same password face sample library are the same; dividing the password face sample library to obtain M levels of face sample sub-libraries according to the historical business information, where M is a positive integer.

In the second aspect, the embodiment of the present application provides a method for business processing based on face recognition, comprising: obtaining business request information of a user, wherein the business request information comprises a confidential business password and a detected face image; under a condition that a number of face samples in a password face sample library corresponding to the confidential business password is greater than or equal to a preset sample number threshold, invoking one level-i face sample sub-library in the password face sample library, and querying, in the one level-i face sample sub-library, a face sample matching the detected face image; wherein the password face sample library comprises M levels of face sample sub-libraries, the M levels of face sample sub-libraries are obtained by division according to historical business information of users corresponding to the face samples, and a number of face samples in each face sample sub-library of each level is less than a number of face samples in the password face sample library, where M and i are positive integers, and $1 \leq i \leq M$.

In a third aspect, an embodiment of the present application provides an apparatus for deploying a face sample library, comprising: an information obtaining module configured to obtain historical business information of users corresponding to face samples in a password face sample library under a condition that a number of face samples in the password face sample library is greater than or equal to a preset sample number threshold, wherein confidential business passwords of the users corresponding to the face samples in the same password face sample library are the same; a sub-library dividing module configured to divide the password face sample library to obtain M levels of face sample sub-libraries according to the historical business information, where M is a positive integer.

In a fourth aspect, an embodiment of the present application provides an apparatus for business processing based on face recognition, comprising: a request obtaining module configured to obtain business request information of a user, wherein the business request information comprises a confidential business password and a detected face image; a recognition module configured to, under a condition that a number of face samples in a password face sample library corresponding to the confidential business password is greater than or equal to a preset sample number threshold, invoke one level-i face sample sub-library in the password face sample library, and query, in the one level-i face sample sub-library, a face sample matching the detected face image; wherein the password face sample library comprises M levels of face sample sub-libraries, the M levels of face sample sub-libraries are obtained by division according to historical business information of users corresponding to the face samples, a number of face samples in each face sample sub-library of each level is less than a number of face samples in the password face sample library, where M and i are positive integers, and $1 \leq i \leq M$.

In the fifth aspect, the embodiments of the present application provide a business device, comprising a processor, a memory, and a computer program stored on the memory and executable on the processor, wherein the computer program, when executed by the processor, implements the steps of the method for deploying a face sample library in the technical solution of the first aspect.

In the sixth aspect, the embodiments of the present application provide a business device, comprising a processor, a memory, and a computer program stored on the memory and executable on the processor, wherein the computer program, when executed by the processor, implements the steps of the method for business processing based on face recognition in the technical solution of the second aspect.

In a seventh aspect, an embodiment of the present application provides a computer-readable storage medium having computer program stored thereon, wherein the computer program, when executed by a processor, implements the steps of the method for deploying a face sample library in the technical solution of the first aspect.

In an eighth aspect, an embodiment of the present application provides a computer-readable storage medium having computer program stored thereon, wherein the computer program, when executed by a processor, implements the steps of the method for business processing based on face recognition in the technical solution of the second aspect.

The embodiment of the application provides a method for deploying a face sample library, a method and an apparatus for business processing based on face recognition. Under a condition that a number of face samples in a password face sample library is greater than or equal to a preset sample number threshold, the password face sample library is divided to obtain M levels of face sample sub-libraries according to the historical business information of the users corresponding to the face samples in the password face sample library. The face sample library can be used for face recognition. Under a condition that the number of face samples in the password face sample library corresponding to a confidential business password is greater than or equal to a preset sample number threshold, one level-i face sample sub-library obtained by dividing the password face sample library is invoked, and a face sample matching the detected face image is queried in the one level-i face sample sub-library, wherein the number of face samples in the level-i face sample sub-library is less than the number of face samples in the password face sample library. Therefore, using the face sample sub-library according to the embodiment of the present application for face recognition in various businesses can reduce the base of face samples for face recognition, thereby improving the accuracy of business processing using face recognition.

BRIEF DESCRIPTION OF THE DRAWINGS

This application can be better understood from the following Details Description of the application in connection with the accompanying drawings, wherein the same or similar reference numbers indicate the same or similar features.

DETAILED DESCRIPTION

Figure 1:
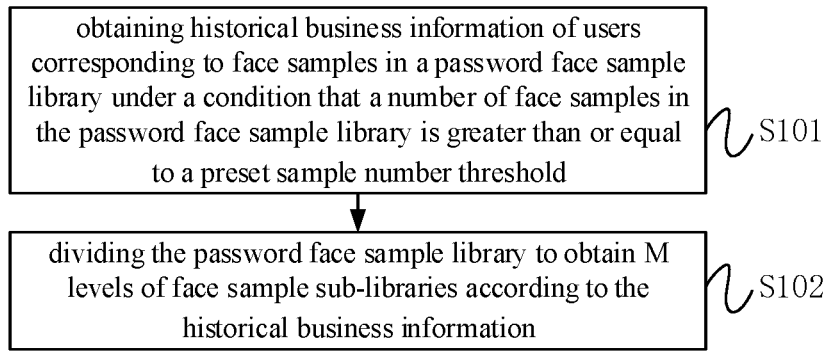
FIG. 1 is a flowchart of a method for deploying a face sample library in an embodiment of the present application.

Features and exemplary embodiments of various aspects of the present application will be described in detail below. In the following detailed description, many specific details are proposed in order to provide a comprehensive understanding of this application. However, it is clear to those skilled in the art that this application can be implemented without some of these specific details. The following description of the embodiments is only to provide a better understanding of the present application by showing examples of the present application. This application is by no means limited to any specific configurations and algorithms proposed below, but covers any modification, replacement and improvement of elements, components and algorithms without departing from the spirit of this application. In the drawings and the following description, well-known structures and technologies are not shown in order to avoid unnecessary obscurity of the application.

An embodiment of the present application provides a method for deploying a face sample library, a method, an apparatus, a terminal device, and a storage medium for business processing based on face recognition, which can be applied to various businesses based on face recognition, such as login business and transaction business, etc., which is not limited herein. The method for deploying face sample library and the method for business processing based on face recognition can be specifically executed by a business device, such as a server. In an embodiment of the present application, a face sample library can be deployed, and face recognition can be performed in the deployed face sample library, so as to improve the accuracy of business processing based on face recognition.

FIG. 1 is a flowchart of a method for deploying a face sample library in an embodiment of the present application. As shown in FIG. 1, the method for deploying a face sample library includes steps S101 to S102.

In step S101, obtaining historical business information of users corresponding to face samples in a password face sample library under a condition that the number of face samples in the password face sample library is greater than or equal to a preset sample number threshold.

In a physical storage environment, all face samples can be stored in a physical table. Face samples with the same confidential business password in the physical table can form a face sample library corresponding to the confidential business password. When invoking the password face sample library, the face samples with the same confidential business password stored in the physical table can be invoked as the password face sample library. A password face sample library may include a plurality of face samples, and users corresponding to the face samples in the same password face sample library have a same confidential business password. That is to say, a password face sample library corresponds to a confidential business password. It should be noted that the confidential business password is confidential for a user, but there may be cases where different users use the same confidential business password, and different users cannot know the other party's confidential business password.

The preset sample number threshold is a number of face samples that can ensure that the accuracy of face recognition reaches an acceptable range. If the number of face samples in the password face sample library is greater than or equal to the preset sample number threshold, the accuracy of face recognition in the password face sample library is outside the acceptable range. The acceptable range of the accuracy of face recognition can be set according to specific work scenarios and work requirements, which is not limited herein.

The historical business information is the historical record information of a user's business operations. For example, the historical time of the user's business operation, the historical frequency of the user's business operation, the historical business content used for the business operation, etc., which are not limited herein.

In step S102, dividing the password face sample library to obtain M levels of face sample sub-libraries according to the historical business information.

According to the historical business information, the face samples in the password face sample library can be classified to obtain M levels of face sample sub-libraries. Specifically, face sample sub-libraries of different levels are divided according to types of the historical business information, and different face sample sub-libraries of the same level are divided according to the attributes of the historical business information.

The number of face samples in each face sample sub-library of each level is less than the number of face samples in the password face sample library, where M is a positive integer. The value of M can be set according to the number of face samples in the password face sample library, resource management requirements and subsequent face recognition efficiency, which is not limited herein. For example, M can be three. An upper level face sample sub-library can be divided to obtain at least one next level face sample sub-library. The number of face samples in the upper level face sample library is greater than any of the next level sub-libraries obtained by the division. The number of face samples in different face sample sub-libraries of the same level may be the same or different, which is not limited herein. The sum of the numbers of face samples in all level-1 face sample sub-libraries obtained by dividing the password face sample library is less than or equal to the number of face samples in the password face sample library. The sum of the numbers of face samples in all the next level face sample sub-libraries obtained by dividing a upper level face sample sub-library is less than or equal to the number of face samples in the upper level face sample sub-library.

For example, the number of face samples in the password face sample library A1 is 2,200. Two level-1 face sample sub-libraries A11 and A12 are obtained by dividing the password face sample library A1. The number of face samples in the level-1 face sample library A11 is 1,700, and the number of face samples in the level-1 face sample library A12 is 500. Three level-2 face sample sub-libraries A111, A112 and A113 are obtained by dividing the level-1 face sample sub-library A11. The number of face samples in the level-2 face sample sub-library A111 is 500, the number of face samples in the level-2 face sample sub-library A112 is 400, and the number of face samples in the level-2 face sample sub-library A113 is 500.

It should be noted that the above-mentioned steps S101 and S102 are operations performed for each face sample library. The level of the face sample sub-library with the smallest number of face samples obtained by dividing different password face sample libraries can be different. For example, the password face sample library A1 can be divided into three levels of face sample sub-libraries, namely, a level-1 face sample sub-library, a level-2 face sample sub-library, and a level-3 face sample sub-library. The password face sample library A2 can be divided into four levels of face sample sub-library, namely, a level-1 face sample sub-library, a level-2 face sample sub-library, a level-3 face sample sub-library and a level-4 face sample sub-library.

In embodiments of the present application, under a condition that a number of face samples in a password face sample library is greater than or equal to the preset sample number threshold, dividing the password face sample library to obtain M levels of face sample sub-library according to the historical business information, where M is a positive integer. The face sample sub-library can be used for face recognition. The number of face samples in each face sample sub-library of each level is less than the number of face samples in the password face sample library. Therefore, face recognition performed in various businesses using the face sample sub-libraries in the embodiment of the present application can reduce the base of face samples for face recognition, thereby improving the accuracy of business processing using face recognition. As the number of face samples in the face sample sub-library is small, the speed of business processing using face recognition can also be improved to a certain extent. Moreover, when the face sample library deployed according to the embodiment of the present application is used for business processing, the user does not need to input additional auxiliary information, which can improve the accuracy of business processing using face recognition, simplify operations, reduce business processing costs, and improve user experience.

Figure 2:
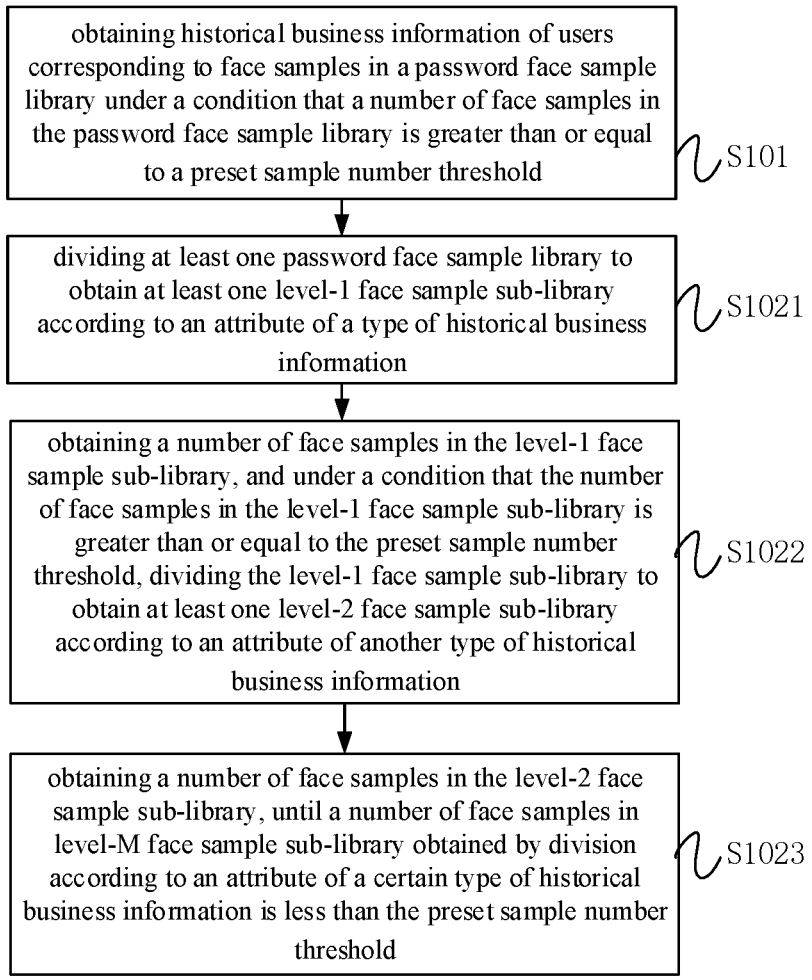
FIG. 2 is a flowchart of a method for deploying a face sample library in another embodiment of the present application.

FIG. 2 is a flowchart of a method for deploying a face sample library in another embodiment of the present application. The difference between FIG. 2 and FIG. 1 is that step S102 shown in FIG. 1 can be refined into step S1021 to step S1023 shown in FIG. 2.

In step S1021, dividing at least one password face sample library to obtain at least one level-1 face sample sub-library according to an attribute of a type of historical business information.

In embodiments of the present application, it is not required to divide at least once in each password face sample library for level-1 face sample. According to specific work scenarios where the face sample library is deployed and specific work requirements, it is possible to determine which face sample library is divided into sample sub-libraries.

The historical business information can be classified into several types of historical business information according to types. In the process of dividing the password face sample library to obtain M levels of face sample sub-libraries, the level of a face sample sub-library can be determined according to different types of historical business information. For example, the historical business information can be classified into three types of historical business information. The level-1 face sample sub-library can be obtained by division according to the attributes of the first type of historical business information, and the level-2 face sample sub-library can be obtained by division according to the attributes of the second type of historical business information, and the level-3 face sample sub-library can be obtained by division according to the attributes of the third type of historical business information.

For example, the historical business information includes location information for a business operation and time information for a business operation. According to the location information for the business operation, the level-1 face sample sub-library can be obtained by dividing the password face sample library. According to the time information for the business operation, the level-2 face sample sub-library can be obtained by dividing the level-1 face sample sub-library.

The number of the level-1 face sample sub-libraries is one or more. The attributes of a type of historical business information of users corresponding to the face samples in the same level-1 face sample sub-library are the same. A type of historical business information has one or more attributes. For example, the number of level-1 face sample sub-libraries is three. One type of historical business information is location information for performing a business operation. The attributes of the location information for performing the business operation may include location 1, location 2, and location 3. Therefore, the attributes of the location information for performing the business operation by the users corresponding to the face samples in the first level-1 face sample sub-library are all location 1, the attributes of the location information for performing the business operation by the users corresponding to the face samples in the second level-1 face sample sub-library are all location 2, and the attributes of the location information for performing the business operation by the users corresponding to the face samples in the third level-1 face sample sub-library are all location 3.

In step S1022, for each level-1 face sample sub-library, obtaining a number of face samples in the level-1 face sample sub-library, and under a condition that the number of face samples in the level-1 face sample sub-library is greater than or equal to the preset sample number threshold, dividing the level-1 face sample sub-library to obtain at least one level-2 face sample sub-library according to an attribute of another type of historical business information.

The number of the level-2 face sample sub-libraries is one or more. The attributes of a type of historical business information of users corresponding to the face samples in the same level-2 face sample sub-library are the same, and the attributes of another type of historical business information of users corresponding to the face samples in the same level-2 face sample sub-library are also the same. The relationship between the level-2 face sample sub-libraries and the attributes of the another type of historical business information can refer to that of the level-1 face sample sub-libraries and the attributes of the one type of historical business information, which will not be repeated here.

In step S1023, for each level-2 face sample sub-library, obtaining a number of face samples in the level-2 face sample sub-library, until a number of face samples in level-M face sample sub-library obtained by division according to an attribute of a certain type of historical business information is less than the preset sample number threshold.

The number of level-M face sample sub-libraries is one or more. The attributes of one type of historical business information of the users corresponding to the face samples in the same level-M face sample sub-library are the same, the attributes of another type of historical business information of the users corresponding to the face samples in the same level-M face sample sub-library are also the same, and the attributes of a certain type of historical business information for dividing the level-M face sample sub-library are the same. For the relationship between the level-M face sample sub-libraries and the attributes of the certain type of historical business information for dividing the level-M face sample sub-library, please refer to the attributes of the level-1 face sample sub-library and the one type of historical business information, which will not be repeated here. To sum up, users corresponding to the face samples in the same level-i face sample sub-library has the same attributes of a certain type of historical business information for dividing the level-i face sample sub-library, where i is a positive integer and $i \leq M$.

In order to achieve higher accuracy of business operations using the face sample sub-library, the division of the face sample sub-library is stopped until the number of face samples in the level-M face sample sub-library is less than the preset sample number threshold.

Using the types and attributes of historical business information, different face sample sub-libraries are divided level by level, so that the face samples of different users are divided according to a certain rule. In the subsequent process of using the face sample library, the speed of querying and recognizing the detected face image can be greatly improved.

In some examples, in order to facilitate the identification of the attributes of the historical business information of the users corresponding to the face samples in each face sample sub-library of each level, a classification data label may be set for each face sample sub-library. The classification data label is to mark the attribute of the historical business information of the user corresponding to the face samples in the face sample sub-library.

As an example, the classification data label may include, but are not limited to, one or more of: a time label, a location label, a business content label, a business provider label, a number-of-request label, and a request frequency label.

The time label may represent the time or period of business request made by the users corresponding to face samples. The location label can represent the location of the business request made by the users corresponding to the face samples. The business content label can represent the content of the business request made by the users corresponding to the face samples. The business provider label may represent the provider of the business performed by the users corresponding to the face samples. The number-of-request label may represent the number of business requests made by the users corresponding to the face samples. The request frequency label may represent the frequency of business requests made by the users corresponding to the face samples.

The classification data label may include level-1 to level-M classification data labels. A level-i face sample sub-library is provided with level-1 to level-i classification data labels, where i is a positive integer, and $i \leq M$.

The deployed face sample library can be used for face query and recognition. Specifically, the query can be performed through the classification data labels set for the face sample library. In some examples, the query priority of the level-i−1 classification data label is higher than that of the level-i classification data label, where $i > 1$. In other examples, the priority of the query of the classification data labels at all levels is not distinguished.

For example, each of the level-1 to level-M classification data labels is the time label, the location label, the business content label, the business provider label, the number-of-request-label, or the request frequency label, can be set based on specific work scenarios and work requirement, which is not limited herein.

Adding the classification data labels to the face sample sub-library can more intuitively obtain types and attributes of the historical information of the users corresponding to the face samples in the face sample sub-library by querying the classification data labels. Therefore, in the subsequent process of processing business using the face sample library to identify users, the face sample sub-library matching the identified user can be invoked more quickly, and the speed of business processing using face recognition can be further improved.

In some examples, since the face sample library can be continuously updated, new face samples may be added to the face sample library. In order to ensure that the number of face samples in each face sample sub-library at each level is kept within a certain number range, the face samples of users with business requests less active can be removed from the face sample sub-library.

For example, a face sample of a user with number of business requests less than a reserved number threshold within a preset time period from a current moment can be removed from a face sample sub-library. The setting of the reserved number threshold can be set according to specific work scenarios and work requirements, which is not limited herein. For example, the face samples of users with a number of business requests less than 5 in the past three months in a certain face sample sub-library may be removed from the face sample sub-library.

The face sample sub-library can be updated in real time or periodically. On the one hand, it can ensure that the face sample sub-library includes face samples of users with a higher degree of activity. Since the users with a higher degree of activity are more likely to initiate business requests again, the possibility that the face sample matching the detected face image can be found in the face sample sub-library can be improved. On the other hand, it can ensure that the number of face samples in the face sample sub-library is kept in a relatively stable state, and the number of face samples in a face sample sub-library will not continue to grow, which ensures the accuracy of the business processing using face recognition.

Figure 3:
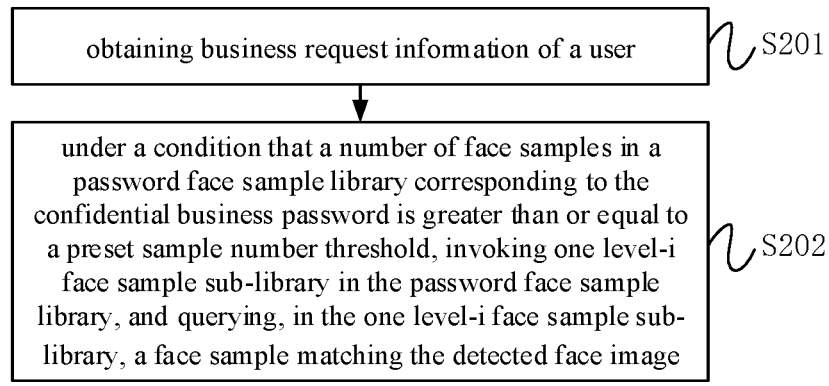
FIG. 3 is a flowchart of a method for business processing based on face recognition in an embodiment of the present application.

Using the face sample library according to the foregoing embodiments, a method for business processing based on face recognition can be implemented. FIG. 3 is a flowchart of a method for business processing based on face recognition according to an embodiment of the present application. As shown in FIG. 3, the method for business processing based on face recognition may include step S201 and step S202.

In step S201, obtaining business request information of a user.

The business request information includes a confidential business password and a detected face image. For the relevant content of the confidential business password, please refer to the relevant description in the above-mentioned embodiments, which will not be repeated here. The detected face image is the face image of the user who initiated the business request information.

In step S202, under a condition that a number of face samples in a password face sample library corresponding to the confidential business password is greater than or equal to a preset sample number threshold, invoking one level-i face sample sub-library in the password face sample library, and querying, in the one level-i face sample sub-library, a face sample matching the detected face image.

After the confidential business password of the user is obtained, it is determined whether the number of face samples in the face sample library corresponding to the confidential business password is greater than or equal to the preset sample number threshold. If the number of face samples in the password face sample library corresponding to the confidential business password is greater than or equal to the preset sample number threshold, one face sample sub-library in M levels of face sample sub-libraries obtained by dividing the password face sample library can be invoked. The invoked face sample sub-library is used for face recognition, and a face sample matching the detected face image is queried in the invoked face sample sub-library. If the number of face samples in the password face sample library corresponding to the confidential business password is less than the preset sample number threshold, the password face sample library can be invoked to query whether there is a face sample matching the detected face image.

The password face sample library includes M levels of face sample sub-libraries. The M levels of face sample sub-libraries are obtained by division according to the historical business information of the users corresponding to face samples in the password face sample library. The number of face samples in each face sample sub-library of each level is less than the number of face samples in the password face sample library. M and i are positive integers, and $1 \le i \le M$. For the relevant content of the password face sample library and the M levels of face sample sub-libraries, please refer to the relevant description in the foregoing embodiments, which will not be repeated herein.

In some examples, if a face sample matching the detected face image is found in an invoked level-i face sample sub-library, a business processing success message can be fed back to the user. If the face sample matching the detected face image is not found in the invoked level-i face sample sub-library, a business processing failure message can also be fed back to the user.

In embodiments of the present application, under a condition that the number of face samples in the password face sample library corresponding to the confidential business password is greater than or equal to a preset sample number threshold, one level-i face sample sub-library obtained by division in the password face sample library is invoked, and a face sample matching the detected face image is queried in the one level-i face sample sub-library. The level-i face sample sub-library is a face sample sub-library in the M levels of face sample sub-libraries obtained by division according to the historical business information of the users corresponding to the face samples in the password face sample library. The number of face samples in the level-i face sample library is less than the number of face samples in the password face sample library. Therefore, invoking the level-i face sample sub-library for face recognition in various business processes can reduce the base of face samples based on the 1:N mode of face recognition, thereby improving the accuracy of business processing based on face recognition. Since the number of face samples in the level-i face sample sub-library is small, the speed of business processing based on face recognition can also be improved to a certain extent. Moreover, in the process of business processing based on face recognition, the user does not need to input additional auxiliary information to improve the accuracy of business processing of face recognition, which simplifies operations and reduces business processing costs. In addition, the user has no perception during the business processing of face recognition, which improves the user experience.

In some examples, the attributes of level-i historical business information of the users corresponding to face samples in the same level-i face sample sub-library are the same.

For the relevant content of the historical business information, please refer to the relevant description in the above-mentioned embodiments, which will not be repeated herein.

To facilitate searching, the face sample sub-libraries in embodiments of the present application may be provided with classification data labels. The classification data label is used to mark the attributes of the historical business information of the users corresponding to the face samples in the face sample sub-library.

As an example, the classification data label includes, but are not limited to, one or more of: a time label, a location label, a business content label, a business provider label, a number-of-request label, and a request frequency label.

In some examples, the classification data label include level-1 to level-M data classification labels, and the level-i face sample sub-library is provided with level-1 to level-i classification data labels.

For the relevant content of the classification data label, please refer to the relevant description in the above-mentioned embodiments, which will not be repeated herein.

Through the classification data labels, the attributes of the historical business information of the users of the face samples in the face sample sub-library can be queried quickly and intuitively, so that in the process of identifying users with the face sample library in the business processing, the face sample sub-library matching with the identified user can be invoked more quickly, which further improves the speed of business processing of face recognition.

Figure 4:
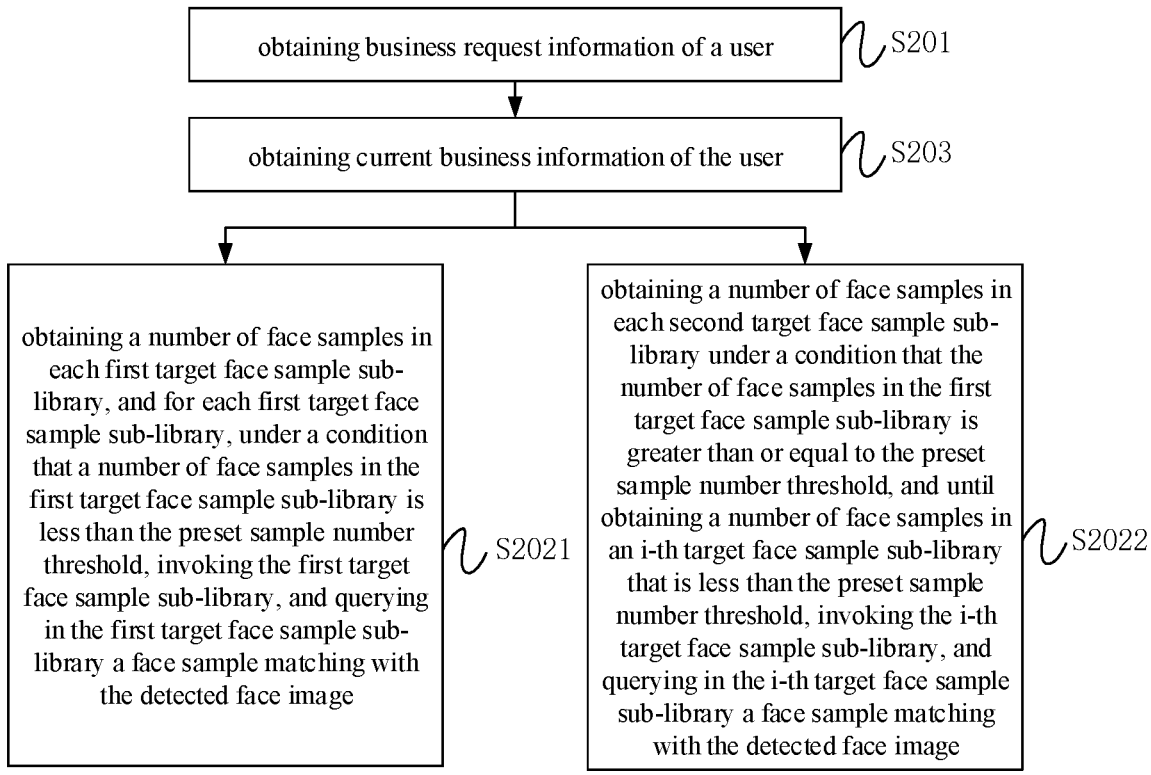
FIG. 4 is a flowchart of a method for business processing based on face recognition in another embodiment of the present application.

In some examples, current business information of the user can also be obtained, and the face sample sub-library to be invoked can be selected according to the current business information of the user. FIG. 4 is a flowchart of a method for business processing based on face recognition in another embodiment of the present application. The difference between FIG. 4 and FIG. 3 is that the method for business processing based on face recognition shown in FIG. 4 may further include step S203. Step S202 shown in FIG. 3 can be refined into step S2021 and step S2022 shown in FIG. 4.

In step S203, obtaining current business information of the user.

The current business information of the user is the information related to the user's business request. For example, the current business information of the user may include but is not limited to one or more of: current business time information, current business location information, current business content information, current business provider information, current number-of-business-request information, and current business request frequency information.

In step S2021, obtaining a number of face samples in each first target face sample sub-library, and for each first target face sample sub-library, under a condition that a number of face samples in the first target face sample sub-library is less than the preset sample number threshold, invoking the first target face sample sub-library, and querying in the first target face sample sub-library a face sample matching with the detected face image.

The current business information of the user has one or more attributes. For example, the current business information of the user includes current business provider information, and the attributes of the current business provider information include provider 1, provider 2, provider 3, and provider 4.

The first target face sample sub-library is a level-1 face sample sub-library with a level-1 classification data label consistent with the attributes of the current business information of the user. The level-1 classification data label marks the attribute of the historical business information of the users corresponding to the face samples in the level-1 face sample sub-library. The level-1 classification data label consistent with the attribute of the current business information of the user means the attribute of the historical business information of the users corresponding to the face samples in the level-1 face sample sub-library marked by the level-1 classification data label is consistent with the attribute of the current business information of the user.

For example, the password face sample library A1 includes four level-1 face sample sub-libraries A11, A12, A13, and A14. The attribute of the historical business information marked by the level-1 classification data label of the level-1 face sample sub-library A11 is provider 1, and the attribute of the historical business information marked by the level-1 classification data label of the level-1 face sample sub-library A12 is the provider 2. The attribute of the historical business information marked by the level-1 classification data label of the level-1 face sample sub-library A13 is the provider 3. The attribute of the historical business information marked by the level-1 classification data label of the level-1 face sample sub-library A14 is the provider 4. The user's current business information is provider 3, therefore the first target face sample sub-library is the level-1 face sample sub-library A13.

If the number of face samples in the first target face sample sub-library is less than the preset sample number threshold, it indicates that the accuracy of face recognition in the first target face sample sub-library is within an acceptable range. Therefore, the first target face sample sub-library can be invoked, and face recognition can be performed in the first target face sample sub-library.

In step S2022, obtaining a number of face samples in each second target face sample sub-library under a condition that the number of face samples in the first target face sample sub-library is greater than or equal to the preset sample number threshold, and until obtaining a number of face samples in an i-th target face sample sub-library that is less than the preset sample number threshold, invoking the i-th target face sample sub-library, and querying in the i-th target face sample sub-library a face sample matching with the detected face image.

If the number of face samples in the first target face sample sub-library is greater than or equal to the preset sample number threshold, it means that the accuracy of face recognition in the first target face sample sub-library is outside the acceptable range. It is necessary to further reduce the base of the face samples on which the face sample sub-library is based, thereby obtaining the second target face sample sub-library.

The second target face sample sub-library is a level-2 face sample sub-library with a level-1 classification data label and a level-2 classification data label consistent with the attributes of the current business information of the user. The level-2 classification data label marks the attribute of the historical business information of the users corresponding to the face samples in the level-2 face sample sub-library. The level-2 classification data label consistent with the attribute of the current business information of the user means the attribute of the historical business information of the users corresponding to the face samples in the level-2 face sample sub-library marked by the level-1 classification data label and the level-2 classification data label is consistent with the attribute of the current business information of the user.

For example, the current business information of the user also includes current business location information, and the attribute of the current business location information in the user's current business information is location 2. In the example of the first target face sample sub-library being the level-1 face sample sub-library A13, if the number of face samples in the level-1 face sample sub-library A13 is greater than or equal to the preset sample number threshold, the respective level-2 classification data labels of the level-2 face sample sub-libraries A131, A132, and A133 obtained by dividing the level-1 face sample sub-library A13 are queried (it should be noted that the respective level-1 classification number labels of the level-2 face sample sub-libraries A131, A132 and A133 are the same as the level-1 classification data label of the level-1 face sample sub-library A13). The attribute of the historical business information marked by the level-2 classification data label of the level-2 face sample sub-library A131 is location 1, and the attribute of the historical business information marked by the level-2 classification data label of the level-2 face sample sub-library A132 is location 2. The attribute of the historical business information marked by the level-2 classification data label of the level-2 face sample sub-library A133 is location 3. Therefore, the second target face sample sub-library is the level-2 face sample sub-library A132.

Similar to step S2021, continue to compare the number of face samples in the second target face sample sub-library with the preset sample number threshold, and so on, until the i-th target face sample sub-library with the number of face samples less than the preset sample number threshold is obtained, invoking the i-th target face sample sub-library, and querying in the i-th target face sample sub-library the face sample matching the detected face image.

The i-th target face sample sub-library is a level-i face sample sub-library with level-1 to level-i classification data labels consistent with the attributes of the current business information of the user.

After obtaining the i-th target face sample sub-library with the number of face samples less than the preset sample number threshold, the i-th target face sample sub-library is invoked, and the face sample matching the detected face image is queried in the i-th target face sample sub-library. For details, please refer to the relevant description of the first target face sample sub-library in S2021, which will not be repeated herein.

The face sample sub-library is queried level by level according to the current business information of the user, so as to locate the face sample sub-library matching the user current business information of the identified user, which improves the accuracy of querying and recognizing the detected face image.

Figure 5:
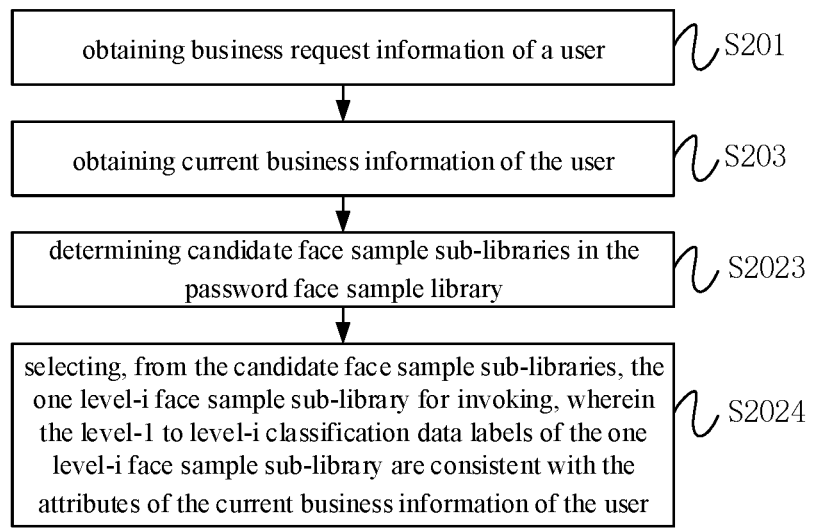
FIG. 5 is a flowchart of a method for business processing based on face recognition in another embodiment of the present application.

In other examples, the current business information of the user can be obtained, and according to the current business information of the user, the face sample sub-library to be invoked can be located more directly. FIG. 5 is a flowchart of a method for business processing based on face recognition in another embodiment of the present application. The difference between FIG. 5 and FIG. 3 is that the method for business processing based on face recognition shown in FIG. 5 may further include step S203. Step S202 shown in FIG. 3 can be refined into step S2023 and step S2024 shown in FIG. 5.

In step S2023, determining candidate face sample sub-libraries in the password face sample library.

The candidate face sample sub-libraries are all level-i face sample sub-libraries having a number of face samples less than the preset sample number threshold.

In order to further increase the speed of business processing using face recognition, all the level-i face sample sub-libraries having a number of face samples less than the preset sample number threshold can be determined firstly in the password face sample library, that is, the face sample sub-libraries having an accuracy of face recognition within an acceptable range can be determined firstly in the password face sample library.

The number of candidate face sample sub-libraries may be one or more. If the number of candidate face sample sub-libraries is one, the candidate face sample sub-library can be directly invoked. If the number of candidate face sample sub-libraries is multiple, the following step S2024 may be performed.

In step S2024, selecting, from the candidate face sample sub-libraries, the one level-i face sample sub-library for invoking, wherein the level-1 to level-i classification data labels of the one level-i face sample sub-library are consistent with the attributes of the current business information of the user.

For example, the candidate face sample sub-libraries are level-2 face sample sub-libraries, and the level-2 face sample sub-libraries have a level-1 classification data label of a business provider label and a level-2 classification data label of a location label. In all level-2 face sample sub-libraries in the password face sample library, a level-2 face sample sub-library with the business provider label and location label consistent with the attribute of the current business provider information and the current business location information in the current business information of the user is determined, and the level-2 face sample sub-library is invoked.

The face sample sub-libraries with an accuracy of face recognition within the acceptable range are determined firstly in the password face sample library, and then the current business information of the user is used to directly locate the face sample sub-library to be invoked, thereby further improving the speed of business processing of face recognition.

Figure 6:
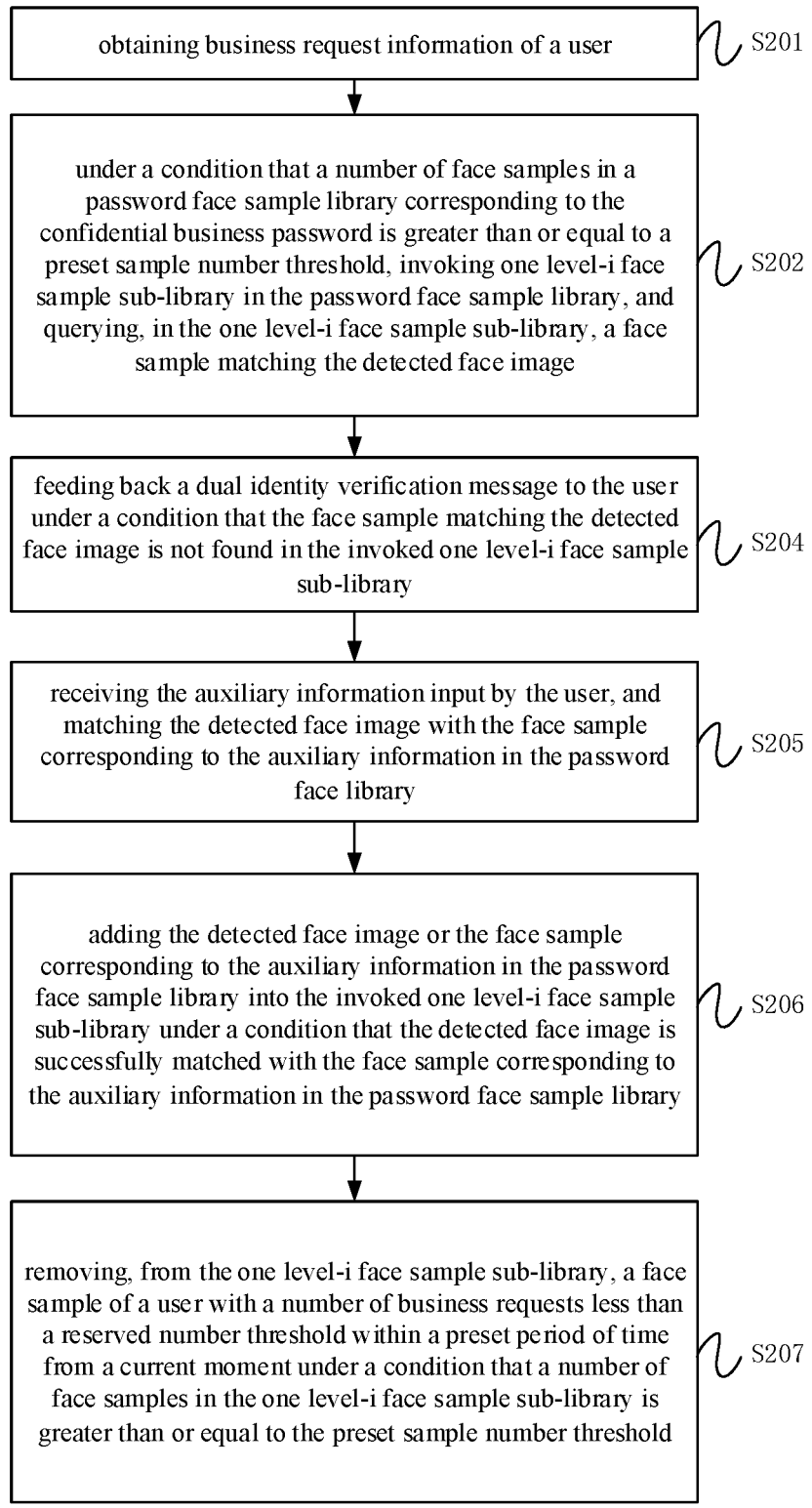
FIG. 6 is a flowchart of a method for business processing based on face recognition in another embodiment of the present application.

In some examples, in the progress of business processing based on face recognition, the face sample sub-libraries in the face sample library may be updated using the Least Recently Used (LRU) algorithm. FIG. 6 is a flowchart of a method for business processing based on face recognition in yet another embodiment of the present application. The difference between FIG. 6 and FIG. 3 is that the method for business processing based on face recognition shown in FIG. 6 may further include step S204 to step S207.

In step S204, feeding back a dual identity verification message to the user under a condition that the face sample matching the detected face image is not found in the invoked one level-i face sample sub-library.

The dual identity verification message is to prompt the user to provide auxiliary information. If no face sample matching the detected face image is found in the invoked face sample sub-library, in order to be able to recognize the detected face image, auxiliary operations can be requested from the user to ensure the success of business processing using face recognition.

In step S205, receiving the auxiliary information input by the user, and matching the detected face image with the face sample corresponding to the auxiliary information in the password face library.

The auxiliary information has a function of narrowing the range of the face samples to be queried that match the detected face image in the password face sample library. The face samples corresponding to the auxiliary information can be queried in the password face sample library, so as to perform the face recognition in the 1:1 mode or the face recognition in the small-scale 1:N mode, that is, to determine whether the detected face image matches the face samples corresponding to the auxiliary information, so that ensuring the user's business can be successfully processed.

Specifically, the auxiliary information may be a mobile phone number, the last few digits of the mobile phone number, etc., which is not limited herein.

In step S206, adding the detected face image or the face sample corresponding to the auxiliary information in the password face sample library into the invoked one level-i face sample sub-library under a condition that the detected face image is successfully matched with the face sample corresponding to the auxiliary information in the password face sample library.

The level-i face sample sub-library to be invoked can be determined based on the user current business information of the user corresponding to the detected face image. It shows that there is a high correlation between the user corresponding to the detected face images and the users corresponding to the face samples in the invoked level-i face sample sub-library, that is, the user current business information of the user corresponding to the detected face image is highly correlated with the historical business information of the users corresponding to the face samples in the invoked level-i face sample sub-library.

If the matching between the detected face image and the face samples using the auxiliary information is successful, the detected face image or the face sample corresponding to the auxiliary information in the password face sample library can be added to the invoked one level-i face sample sub-library. If the user corresponding to the detected face image performs business processing again, the matched face sample sub-library can be quickly invoked, so that the success of face recognition can be guaranteed.

In step S207, removing, from the one level-i face sample sub-library, a face sample of a user with a number of business requests less than a reserved number threshold within a preset period of time from a current moment under a condition that a number of face samples in the one level-i face sample sub-library is greater than or equal to the preset sample number threshold.

In some examples, after the detected face image or the face sample corresponding to the auxiliary information is added to the invoked one level-i face sample sub-library as a face sample in step S206, the number of face samples in the level-i face sample sub-library may be greater than or equal to the preset sample number threshold. In order to ensure that the accuracy of face recognition using the level-i face sample sub-library is within an acceptable range, it's required to ensure that the number of face samples in the level-i face sample sub-library is less than the preset sample number threshold. The face samples of users with a number of business requests less than a reserved number threshold within a preset period of time from a current moment is removed from the level-i face sample sub-library, so as to ensure that the number of face samples in the level-i face sample sub-library is less than the preset sample number threshold.

The preset period of time and reserved number threshold can be set according to specific work scenarios and work requirements, which are not limited herein. For example, the preset period of time may be 1 month, and the reserved number threshold may be 1.

The face sample sub-library is updated in real time or periodically. On the one hand, it can ensure that the face sample sub-library includes face samples of users with a higher degree of activity. Since the users with a higher degree of activity are more likely to initiate business requests again, the possibility that the face sample matching the detected face image can be found in the face sample sub-library can be improved. On the other hand, it can ensure that the number of face samples in the face sample sub-library is kept in a relatively stable state, and the number of face samples in a face sample sub-library will not continue to grow, which ensures the accuracy of the business processing using face recognition.

The method for business processing based on face recognition in embodiments of the present application can be applied to scenarios where face recognition is used for business processing, such as transaction scenarios, login scenarios, and so on. In order to explain more clearly, the following description is based on a transaction scenario.

Transaction Scenario:

In a transaction scenario, the confidential business password may specifically be a payment password, such as a payment passcode.

A face sample library for transaction can be pre-deployed. According to a payment password, a password face sample library can be built. A password face sample library corresponds to a payment password. For each face sample library, if the number of face samples in the password face sample library is greater than or equal to a preset sample number threshold, at least one level-1 face sample sub-library can be obtained by dividing the password face sample library according to a certain type of historical business information of users corresponding to face samples in the password face sample library. For each level-1 face sample sub-library, if the number of face samples in the level-1 face sample sub-library is greater than or equal to the preset sample number threshold, at least one level-2 face sample sub-library can be obtained by dividing the level-1 face sample library according to another type of historical business information of users corresponding to face samples in the level-1 face sample sub-library, and so on, until the number of face samples in the level-M face sample sub-library obtained by dividing the level-M−1 face sample sub-library is less than the present sample number threshold.

In order to facilitate subsequent business processing, a classification data label can be set for each face sample sub-library of each level. In the transaction scenario, the classification data label may be related to data information of users, merchants, terminals, and acquirers, etc. involved in the transaction process, but is not limited to the above information.

For example, the classification data label may include, but are not limited to, one or more of a transaction time label, a transaction amount label, a transaction merchant number label, a transaction acquirer label, a transaction terminal number label, a transaction location label, a number of transactions label, etc. The transaction time label can represent the preset time length from the current transaction moment, for example, the last 3 months, the last week, etc. The transaction time label can represent the period of time during which the transaction occurs, for example, morning, afternoon, evening, etc.

In addition, it is possible to dynamically maintain and update the aforementioned face sample library and various face sample sub-libraries at all levels.

For example, when a new face sample is added to the password face sample library, if the number of face samples in the password face sample library is less than the preset sample number threshold before the new face sample is added to the password face sample library and the number of face samples in the password face sample library is greater than or equal to the preset sample number threshold after the new face samples is added to the password face sample library, then M levels of face sample sub-libraries can be obtained by dividing the password face sample library having the new face sample added according to the historical business information of the user corresponding to the new face sample and the historical business information of the users corresponding to the original face samples in the password face sample library. The value of M can be set according to specific work scenarios and work requirements.

If the number of face samples in the password face sample library is less than the preset sample number threshold after the new face sample is added to the password face sample library, it's not necessary to obtain the M levels of face sample sub-libraries by dividing the password face sample library having the new face sample added.

For another example, in the case that there exists M levels of face sample sub-libraries, if there is a new face sample to be added to the passcode face sample library, based on historical business information of the user corresponding to the new face sample, the new face sample can be added to a level-i face sample sub-library having a classification data label consistent with the attribute of the historical business information. If the number of face samples in the level-i face sample sub-library is greater than or equal to the preset sample number threshold after the new face sample is added into the level-i face sample sub-library, a face sample of a user with a number of business requests less than a reserved number threshold within a preset period of time from a current moment can be removed from the level-i face sample sub-library, until the number of face samples in the level-i face sample sub-library is less than the preset sample number threshold. Thus, in embodiments of the present application, the dynamic maintenance and update of the password face sample library and the face sample sub-libraries at all levels in the face sample library are realized, so that the password face sample library and each face sample sub-library of each level can be closer to the current actual situation.

The following two instances are used to illustrate the business processing based on face recognition.

Instance 1: in the process of business processing based on face recognition, the user's payment password and detected face image are obtained. The payment password is 135323. The preset sample number threshold is 1000. The number of face samples in the password face sample library A1 corresponding to the character password 135323 is then determined. If the number of face samples in the password face sample library A1 is less than 1000, the 1:N mode of face recognition is directly performed in the password face sample library A1.

If the number of face samples in the password face sample library A1 is greater than or equal to 1000, the number of face samples in the level-1 face sample sub-library A11 obtained by dividing the password face sample library A1 is determined. The level-1 face sample sub-library A11 is provided with a level-1 classification data label of "3 months", which indicates that the level-1 face sample sub-library A11 includes face samples of users who have issued transaction requests in the past three months. If the number of face samples in the level-1 face sample sub-library A11 is less than 1000, then the 1:N mode of face recognition is performed in the level-1 face sample sub-library A11. If the number of face samples in the level-1 face sample sub-library A11 is greater than or equal to 1000, the number of face samples in each level-2 face sample sub-library obtained by dividing the level-1 face sample sub-library A11 is determined.

The level-2 face sample sub-libraries includes level-2 face sample sub-libraries A111 and A112. The level-2 face sample library A111 is provided with a level-1 classification data label of "3 months" and a level-2 classification data label of "Shanghai", and the level-2 face sample sub-library A112 is provided with a level-1 classification data label of "3 months" and a level-2 classification data label of "Beijing". The level-2 class data label of "Shanghai" for the level-2 face sample sub-library A111 indicates that the level-2 face sample sub-library A111 includes the face samples of users whose transaction requests occurred in Shanghai. The level-2 data label of "Beijing" for the level-2 face sample sub-library A112 indicates that the level-2 face sample sub-library A112 includes the face samples of users whose transaction requests occurred in Beijing. Current business information of the user is obtained, and the location of the user's current transaction request is found occurred in Shanghai. Then the number of face samples in the level-2 face sample sub-library A111 is determined. If the number of face samples in the level-2 face sample sub-library A111 is less than 1000, the 1:N mode of face recognition is performed in the level-2 face sample sub-library A111.

Instance 2: in the process of business processing based on face recognition, the user's payment password and detected face image are obtained. The payment password is 135323. The preset sample number threshold is 1000. The password face sample library corresponding to the character password 135323 is password face sample library A1. A level-1 face sample sub-library obtained by dividing the password face sample library A1 includes a level-1 face sample sub-library A11. Level-2 face sample sub-libraries obtained by dividing the level-1 face sample sub-library A11 includes level-2 face sample sub-libraries A111 and A112, wherein the number of face samples in each of the level-2 face sample sub-libraries A111 and A112 is less than 1,000.

The level-2 face sample sub-library A111 is provided with a level-1 classification data label of "3 months" and a level-2 classification data label of "Shanghai", and the level-2 face sample sub-library A112 is provided with a level-1 classification data label of "3 months" and a level-2 classification data label of "Beijing".

The user's current business information is obtained, and the location of the user's current business request is found occurred in Shanghai. The secondary face sample sub-library A111 is then invoked, and the 1:N mode of face recognition is performed in the level-2 face sample sub-library A111.

In the above instance, level-1 to level-M classification data labels can specifically be several of the following: a transaction time label, a transaction amount label, a transaction merchant number label, a transaction acquirer label, a transaction terminal number label, a transaction location label, a number of transactions label, the combination of the classification data labels of different levels is not limited herein, and the combination of the classification data labels of the different levels can be set according to specific work scenarios and requirements, which is not limited herein.

It is worth mentioning that when the 1:N mode of face recognition is performed in the level-2 face sample sub-library A111 in the above instance, if no face sample matching the detected face image is recognized, a prompt message prompting the user to enter the mobile phone number or the last few digits of the mobile phone number can be issued. Thus, according to the mobile phone number or the last few digits of the mobile phone number input by the user, the face recognition in 1:1 mode, or the face recognition in 1:N mode in a reduced range, can be performed. The detected face image can also be added to the level-2 face sample sub-library A111 as a face sample. After the detected face image is added into the level-2 face sample sub-library A111, if the number of face samples in the level-2 face sample sub-library A111 is greater than or equal to 1000, the face samples of users with least transaction requests can be removed from the level-2 face sample sub-library A111.

It should be noted that a login scenario can refer to the foregoing transaction scenario, and the login scenario can be applied to specific scenarios such as website login and clocking in at work, which is not limited herein.

The difference is that the confidential business password in the login scenario is a login password, such as a login passcode. The classification data labels in the login scenario may include, but are not limited to, one or more of a login time label, a login location label, and a login system area label, etc. The login time label may represent a preset time length from the current login moment, for example, the past 1 month, the past 2 weeks, etc. The login time label can also represent the period of time during which the login occurs, for example, morning, afternoon, evening, etc. The login location label may represent the location where the login occurred. The login system area label can represent the system that is logged in and the area in the system, etc.

Figure 7:
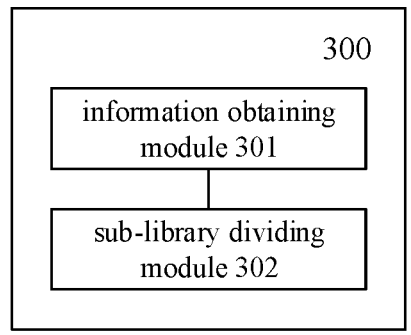
FIG. 7 is a structural schematic diagram of an apparatus for deploying a face sample library in an embodiment of the present application.

FIG. 7 is a structural schematic diagram of an apparatus for deploying a face sample library in an embodiment of the present application. As shown in FIG. 7, the apparatus 300 for deploying a face sample library may include an information obtaining module 301 and a sub-library division module 302.

The information obtaining module 301 is configured to obtain historical business information of users corresponding to face samples in a password face sample library under a condition that a number of face samples in the password face sample library is greater than or equal to a preset sample number threshold, wherein confidential business passwords of the users corresponding to the face samples in the same password face sample library are the same.

The sub-library division module 302 is configured to divide the password face sample library to obtain M levels of face sample sub-libraries according to the historical business information, where M is a positive integer, wherein a number of face samples in each face sample sub-library of each level is less than the number of face samples in the password face sample library, where M is a positive integer.

In embodiments of the present application, under a condition that a number of face samples in a password face sample library is greater than or equal to the preset sample number threshold, dividing the password face sample library to obtain M levels of face sample sub-library according to historical business information of users corresponding to face samples in the password face sample library. The face sample sub-library can be used for face recognition. The number of face samples in each face sample sub-library of each level is less than the number of face samples in the password face sample library. Therefore, face recognition performed in various businesses using the face sample sub-libraries in the embodiment of the present application can reduce the base of face samples for face recognition, thereby improving the accuracy of business processing using face recognition. As the number of face samples in the face sample sub-library is small, the speed of business processing using face recognition can also be improved to a certain extent. Moreover, when the face sample library deployed according to the embodiment of the present application is used for business processing, the user does not need to input additional auxiliary information, which can improve the accuracy of business processing using face recognition, simplify operations, reduce business processing costs, and improve user experience.

In some examples, the sub-library division module 302 may be specifically configured to: divide at least one password face sample library to obtain at least one level-1 face sample sub-library according to an attribute of a type of historical business information; for each level-1 face sample sub-library, obtaining a number of face samples in the level-1 face sample sub-library, and under a condition that the number of face samples in the level-1 face sample sub-library is greater than or equal to the preset sample number threshold, dividing the level-1 face sample sub-library to obtain at least one level-2 face sample sub-library according to an attribute of another type of historical business information; for each level-2 face sample sub-library, obtaining a number of face samples in the level-2 face sample sub-library, until a number of face samples in level-M face sample sub-library obtained by division according to an attribute of a certain type of historical business information is less than the preset sample number threshold.

In some examples, the sub-library division module 302 may also be configured to set a classification data label for each face sample sub-library, wherein the classification data label is to mark the attribute of the historical business information of the users corresponding to the face samples in the face sample sub-library For example, the classification data label comprises one or more of: a time label, a location label, a business content label, a business provider label, a number-of-request label, and a request frequency label.

Specifically, the classification data label comprises level-1 to level-M classification data labels. A level-i face sample sub-library is provided with level-1 to level-i classification data labels, where i is a positive integer, and i≤M.

The attributes of the historical business information of the users corresponding to the face samples in the same level-i face sample sub-library are the same, where i is a positive integer, and i≤M.

In some examples, the sub-library division module 302 may also be configured to remove, from a face sample sub-library, a face sample of a user with a number of business requests less than a reserved number threshold within a preset period of time from a current moment.

Figure 8:
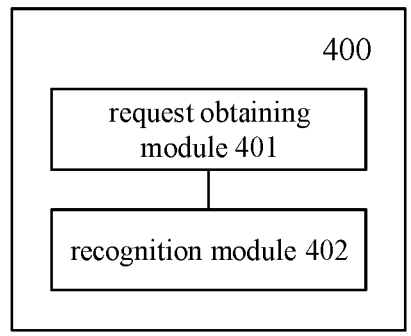
FIG. 8 is a structural schematic diagram of an apparatus for business processing based on face recognition in an embodiment of the present application.

FIG. 8 is a structural schematic diagram of an apparatus for business processing based on face recognition in an embodiment of the present application. As shown in FIG. 8, the apparatus 400 for business processing based on face recognition may include a request obtaining module 401 and a recognition module 402.

The request obtaining module 401 is configured to obtain business request information of a user, wherein the business request information comprises a confidential business password and a detected face image.

The recognition module 402 is configured to, under a condition that a number of face samples in a password face sample library corresponding to the confidential business password is greater than or equal to a preset sample number threshold, invoke one level-i face sample sub-library in the password face sample library, and query, in the one level-i face sample sub-library, a face sample matching the detected face image.

The password face sample library may comprise M levels of face sample sub-libraries, the M levels of face sample sub-libraries are obtained by division according to historical business information of users corresponding to the face samples, a number of face samples in each face sample sub-library of each level is less than a number of face samples in the password face sample library, where M and i are positive integers, and $1 \leq i \leq M$.

In embodiments of the present application, under a condition that the number of face samples in the password face sample library corresponding to the confidential business password is greater than or equal to a preset sample number threshold, one level-i face sample sub-library obtained by division in the password face sample library is invoked, and a face sample matching the detected face image is queried in the one level-i face sample sub-library. The level-i face sample sub-library is a face sample sub-library in the M levels of face sample sub-libraries obtained by division according to the historical business information of the users corresponding to the face samples in the password face sample library. The number of face samples in the level-i face sample library is less than the number of face samples in the password face sample library. Therefore, invoking the level-i face sample sub-library for face recognition in various business processes can reduce the base of face samples based on the 1:N mode of face recognition, thereby improving the accuracy of business processing based on face recognition. Since the number of face samples in the level-i face sample sub-library is small, the speed of business processing based on face recognition can also be improved to a certain extent. Moreover, in the process of business processing based on face recognition, the user does not need to input additional auxiliary information to improve the accuracy of business processing of face recognition, which simplifies operations and reduces business processing costs. In addition, the user has no perception during the business processing of face recognition, which improves the user experience.

In some examples, attributes of the historical business information of the users corresponding to the face samples in the same level-i face sample sub-library are the same.

In some examples, the face sample sub-library is provided with a classification data label, and the classification data label is to mark attributes of the historical business information of the users corresponding to the face samples in the face sample sub-library.

Further, the classification data label comprises level-1 to level-M data classification labels, wherein a level-i face sample sub-library is provided with level-1 to level-i classification data labels.

In some examples, the request obtaining module 401 described above may also be configured to obtain current business information of the user.

For example, wherein the current business information of the user comprises one or more of: current business time information, current business location information, current business content information, current business provider information, current number-of-business-request information, and current business request frequency information.

The aforementioned recognition module 402 may be specifically configured to: obtain a number of face samples in each first target face sample sub-library, and for each first target face sample sub-library, invoking the first target face sample sub-library under a condition that a number of face samples in the first target face sample sub-library is less than the preset sample number threshold; obtain a number of face samples in each second target face sample sub-library under a condition that the number of face samples in the first target face sample sub-library is greater than or equal to the preset sample number threshold, and until obtaining a number of face samples in an i-th target face sample sub-library that is less than the preset sample number threshold, invoke the i-th target face sample sub-library.

The first target face sample sub-library is a level-1 face sample sub-library with a level-1 classification data label consistent with the attributes of the current business information of the user, the second target face sample sub-library is a level-2 face sample sub-library with a level-1 classification data label and a level-2 classification data label consistent with the attributes of the current business information of the user, and the i-th target face sample sub-library is a level-i face sample sub-library with level-1 level-i classification data labels consistent with the attributes of the current business information of the user.

In other examples, the aforementioned recognition module 402 may be specifically configured to: determine candidate face sample sub-libraries in the password face sample library, wherein the candidate face sample sub-libraries are all level-i face sample sub-libraries having a number of face samples less than the preset sample number threshold; select, from the candidate face sample sub-libraries, the one level-i face sample sub-library for invoking, wherein the level-1 to level-i classification data labels of the one level-i face sample sub-library are consistent with the attributes of the current business information of the user.

In some examples, the aforementioned recognition module 402 can also be configured to feed back a dual identity verification message to the user under a condition that the face sample matching the detected face image is not found in the invoked one level-i face sample sub-library, wherein the dual identity verification message is to prompt the user to provide auxiliary information; receive the auxiliary information input by the user, and match the detected face image with the face sample corresponding to the auxiliary information in the password face library.

The aforementioned recognition module 402 can also be configured to, add the detected face image or the face sample corresponding to the auxiliary information in the password face sample library into the invoked one level-i face sample sub-library under a condition that the detected face image is successfully matched with the face sample corresponding to the auxiliary information in the password face sample library.

In some examples, the aforementioned recognition module 402 may also be configured to: remove, from the one level-i face sample sub-library, a face sample of a user with a number of business requests less than a reserved number threshold within a preset period of time from a current moment under a condition that a number of face samples in the one level-i face sample sub-library is greater than or equal to the preset sample number threshold.

In some examples, the confidential business password comprises a payment password or a login password.

In some examples, the classification data label comprises one or more of: a time label, a location label, a business content label, a business provider label, a number-of-request label, and a request frequency label.

Figure 9:
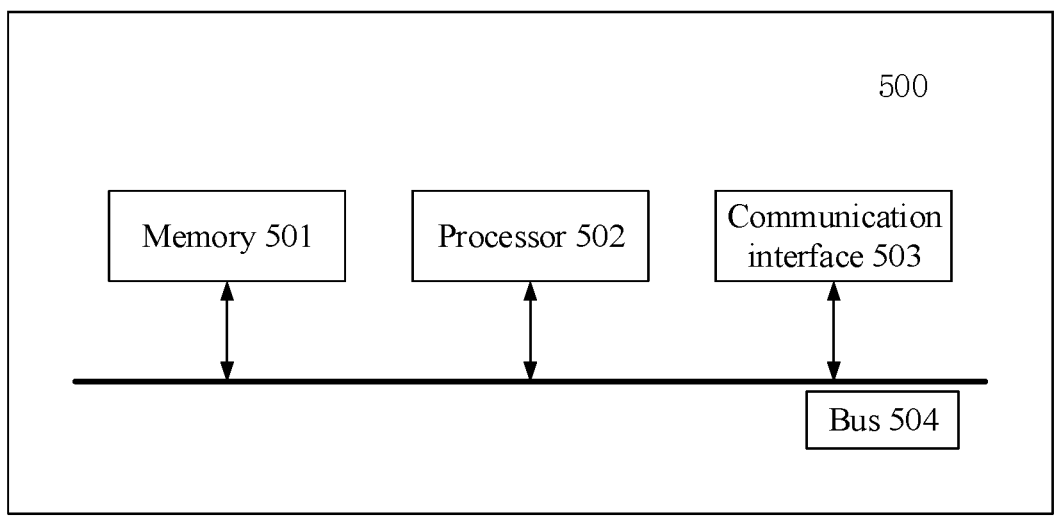
FIG. 9 is a structural schematic diagram of a business device in an embodiment of the present application.

FIG. 9 is a structural schematic diagram of a business device in an embodiment of the present application. As shown in FIG. 9, the business device 500 includes a memory 501, a processor 502, and a computer program stored in the memory 501 and executable on the processor 502.

In an example, the aforementioned processor 502 may include a central processing unit (CPU), or a specific integrated circuit (ASIC), or may be configured to one or more integrated circuits for implementing embodiments of the present application.

The memory 501 may include a mass memory for data or instructions. By way of example and not limitation, the memory 501 may include an HDD, a floppy disk drive, a flash memory, an optical disk, a magneto-optical disk, a magnetic tape, or a universal serial bus (USB) drive, or a combination of two or more of the above. If applicable, the memory 501 may include removable or non-removable (or fixed) media. If applicable, the memory 501 can be inside or outside of the terminal hotspot opened business device 500. In a particular embodiment, the memory 501 is a non-volatile solid state memory. In a particular embodiment, the memory 501 includes read-only memory (ROM). If applicable, the ROM can be mask-programmed ROM, programmable ROM (PROM), erasable PROM (EPROM), electrically erasable PROM (EEPROM), electrically rewritable ROM (EAROM) or flash memory or a combination of two or more of the above.

The processor 502 runs the computer program corresponding to executable program code by reading the executable program code stored in the memory 501, so as to implement the method for deploying a face sample library and/or the method for business processing based on face recognition in the foregoing embodiments.

In an example, the business device 500 may further include a communication interface 503 and a bus 504. As shown in FIG. 9, the memory 501, the processor 502, and the communication interface 503 are connected through the bus 504 and communicate with each other.

The communication interface 503 is mainly used to implement communication between various apparatuses, devices, units and/or devices in the embodiments of the present application. An input device and/or output device can also be connected through the communication interface 503.

The bus 504 includes hardware, software, or both, and couples the components of the business device 500 to each other. By way of example and not limitation, the bus 504 may include an accelerated graphics port (AGP) or other graphics bus, an enhanced industry standard architecture (EISA) bus, a front side bus (FSB), a hypertransport (HT) interconnect, an industry standard architecture (ISA)) bus, a unlimited bandwidth interconnect, a low pin count (LPC) bus, a memory bus, a microchannel architecture (MCA) bus, a peripheral component interconnect (PCI) bus, a PCI-Express (PCI-X) bus, a Serial Advanced Technology Attachment (SATA) bus, a Video Electronics Standards Association Local (VLB) bus or other suitable bus or a combination of two or more of the above. If applicable, the bus 504 may include one or more buses. Although the embodiments of this application describe and show a specific bus, this application considers any suitable bus or interconnection.

An embodiment of the present application also provides a computer-readable storage medium having a computer program stored thereon, and the computer program when executed by a processor, implements the method for deploying a face sample library and/or the method for business processing based on face recognition according to the above embodiments.

It should be clear that the various embodiments in this specification are described in a progressive manner, and the same or similar parts between the various embodiments can be referred to each other, and each embodiment focuses on the differences from other embodiments. For the apparatus embodiment, the business device embodiment, and the computer-readable storage medium embodiment, relevant details please refer to the description part of the method embodiment. The application is not limited to the specific steps and structures described above and shown in the figures. Those skilled in the art can make various changes, modifications and additions, or change the order between steps after grasping the spirit of the application. For the sake of brevity, a detailed description of the known method and technology is omitted herein.

Those skilled in the art should understand that above embodiments are all exemplary rather than restrictive. Different technical features appearing in different embodiments can be combined to achieve beneficial effects. Those skilled in the art should be able to understand and implement other modified embodiments of the disclosed embodiments on the basis of studying the drawings, the description and the claims. In the claims, the term "comprising" does not exclude other means or steps; the indefinite article "a" does not exclude multiple; the terms "first" and "second" are used to denote names rather than to indicate any specific order. Any reference signs in the claims should not be construed as limiting the scope of protection. The functions of multiple parts appearing in the claims can be implemented by a single hardware or software module. The appearance of certain technical features in different dependent claims does not mean that these technical features cannot be combined to achieve beneficial effects.

What is claimed is:

1. A method for deploying a face sample library, comprising:
    obtaining historical business information of users corresponding to face samples in a password face sample library under a condition that a number of face samples in the password face sample library is greater than or equal to a preset sample number threshold, wherein confidential business passwords of the users corresponding to the face samples in the same password face sample library are the same;
    dividing the password face sample library to obtain M levels of face sample sub-libraries according to the historical business information, where M is a positive integer;
    performing face recognition processing based on the obtained M levels of face sample sub-libraries,
    wherein the dividing the password face sample library to obtain M levels of face sample sub-libraries according to the historical business information comprises:
    dividing at least one password face sample library to obtain at least one level-1 face sample sub-library according to an attribute of a type of historical business information;
    for each level-1 face sample sub-library, obtaining a number of face samples in the level-1 face sample sub-library, and under a condition that the number of face samples in the level-1 face sample sub-library is greater than or equal to the preset sample number threshold, dividing the level-1 face sample sub-library to obtain at least one level-2 face sample sub-library according to an attribute of another type of historical business information;

for each level-2 face sample sub-library, obtaining a number of face samples in the level-2 face sample sub-library, until a number of face samples in level-M face sample sub-library obtained by division according to an attribute of a certain type of historical business information is less than the preset sample number threshold.

2. The method of claim 1, further comprising:

setting a classification data label for each face sample sub-library, wherein the classification data label is to mark the attribute of the historical business information of the users corresponding to the face samples in the face sample sub-library.

3. The method of claim 2, wherein the classification data label comprises level-1 to level-M classification data labels, a level-i face sample sub-library is provided with level-1 to level-i classification data labels, wherein the attributes of the historical business information of the users corresponding to the face samples in the same level-i face sample sub-library are the same, where i is a positive integer, and i≤M.

4. The method of claim 1, further comprising:

removing, from a face sample sub-library, a face sample of a user with a number of business requests less than a reserved number threshold within a preset period of time from a current moment.

5. The method of claim 2, wherein the classification data label comprises one or more of:

a time label, a location label, a business content label, a business provider label, a number-of-request label, and a request frequency label.

6. A method for business processing based on face recognition, comprising:

obtaining business request information of a user, wherein the business request information comprises a confidential business password and a detected face image;

under a condition that a number of face samples in a password face sample library corresponding to the confidential business password is greater than or equal to a preset sample number threshold, invoking one level-i face sample sub-library in the password face sample library, and querying, in the one level-i face sample sub-library, a face sample matching the detected face image;

wherein the password face sample library comprises M levels of face sample sub-libraries, the M levels of face sample sub-libraries are obtained by division according to historical business information of users corresponding to the face samples, and a number of face samples in each face sample sub-library of each level is less than a number of face samples in the password face sample library, where M and i are positive integers, and 1≤i≤M, wherein attributes of the historical business information of the users corresponding to the face samples in the same level-i face sample sub-library are the same.

7. The method of claim 6, wherein:

the face sample sub-library is provided with a classification data label, and the classification data label is to mark attributes of the historical business information of the users corresponding to the face samples in the face sample sub-library.

8. The method of claim 7, wherein the classification data label comprises level-1 to level-M data classification labels, wherein a level-i face sample sub-library is provided with level-1 to level-i classification data labels.

9. The method of claim 8, further comprising:

obtaining current business information of the user;

wherein the invoking one level-i face sample sub-library in the password face sample library comprises:

obtaining a number of face samples in each first target face sample sub-library, and for each first target face sample sub-library, invoking the first target face sample sub-library under a condition that a number of face samples in the first target face sample sub-library is less than the preset sample number threshold;

obtaining a number of face samples in each second target face sample sub-library under a condition that the number of face samples in the first target face sample sub-library is greater than or equal to the preset sample number threshold, and until obtaining a number of face samples in an i-th target face sample sub-library that is less than the preset sample number threshold, invoking the i-th target face sample sub-library;

wherein the first target face sample sub-library is a level-1 face sample sub-library with a level-1 classification data label consistent with the attributes of the current business information of the user, the second target face sample sub-library is a level-2 face sample sub-library with a level-1 classification data label and a level-2 classification data label consistent with the attributes of the current business information of the user, and the i-th target face sample sub-library is a level-i face sample sub-library with level-1 to level-i classification data labels consistent with the attributes of the current business information of the user.

10. The method of claim 9, wherein the current business information of the user comprises one or more of:

current business time information, current business location information, current business content information, current business provider information, current number-of-business-request information, and current business request frequency information.

11. The method of claim 8, further comprising:

obtaining current business information of the user;

wherein the invoking one level-i face sample sub-library in the password face sample library comprises:

determining candidate face sample sub-libraries in the password face sample library, wherein the candidate face sample sub-libraries are all level-i face sample sub-libraries having a number of face samples less than the preset sample number threshold;

selecting, from the candidate face sample sub-libraries, the one level-i face sample sub-library for invoking, wherein the level-1 to level-i classification data labels of the one level-i face sample sub-library are consistent with the attributes of the current business information of the user.

12. The method of claim 7, wherein the classification data label comprises one or more of:

a time label, a location label, a business content label, a business provider label, a number-of-request label, and a request frequency label.

13. The method of claim 6, further comprising:

feeding back a dual identity verification message to the user under a condition that the face sample matching the detected face image is not found in the invoked one level-i face sample sub-library, wherein the dual identity verification message is to prompt the user to provide auxiliary information;

receiving the auxiliary information input by the user, and matching the detected face image with the face sample corresponding to the auxiliary information in the password face library.

14. The method of claim 13, further comprising:
adding the detected face image or the face sample corresponding to the auxiliary information in the password face sample library into the invoked one level-i face sample sub-library under a condition that the detected face image is successfully matched with the face sample corresponding to the auxiliary information in the password face sample library.

15. The method of claim 14, further comprising:
removing, from the one level-i face sample sub-library, a face sample of a user with a number of business requests less than a reserved number threshold within a preset period of time from a current moment under a condition that a number of face samples in the one level-i face sample sub-library is greater than or equal to the preset sample number threshold.

16. The method of claim 6, wherein the confidential business password comprises a payment password or a login password.

17. A business device, comprising a processor, a memory, and a computer program stored on the memory and executable on the processor, wherein the computer program, when executed by the processor, causes the processor to perform operations, comprising:
obtaining historical business information of users corresponding to face samples in a password face sample library under a condition that a number of face samples in the password face sample library is greater than or equal to a preset sample number threshold, wherein confidential business passwords of the users corresponding to the face samples in the same password face sample library are the same;
dividing the password face sample library to obtain M levels of face sample sub-libraries according to the historical business information, where M is a positive integer;
performing face recognition processing based on the obtained M levels of face sample sub-libraries,
wherein the dividing the password face sample library to obtain M levels of face sample sub-libraries according to the historical business information comprises:
dividing at least one password face sample library to obtain at least one level-1 face sample sub-library according to an attribute of a type of historical business information;
for each level-1 face sample sub-library, obtaining a number of face samples in the level-1 face sample sub-library, and under a condition that the number of face samples in the level-1 face sample sub-library is greater than or equal to the preset sample number threshold, dividing the level-1 face sample sub-library to obtain at least one level-2 face sample sub-library according to an attribute of another type of historical business information;
for each level-2 face sample sub-library, obtaining a number of face samples in the level-2 face sample sub-library, until a number of face samples in level-M face sample sub-library obtained by division according to an attribute of a certain type of historical business information is less than the preset sample number threshold.

* * * * *